(12) United States Patent
Jung et al.

(10) Patent No.: US 8,625,778 B2
(45) Date of Patent: Jan. 7, 2014

(54) METHOD OF AUTHENTICATION, AND IMAGE DISPLAY APPARATUS INCORPORATING THE METHOD

(75) Inventors: Jae-woong Jung, Suwon-si (KR); Ho Lee, Suwon-si (TW)

(73) Assignee: Samsung Electronics Co., Ltd., Suwon-si (KR)

( * ) Notice: Subject to any disclaimer, the term of this patent is extended or adjusted under 35 U.S.C. 154(b) by 1365 days.

(21) Appl. No.: 11/737,235

(22) Filed: Apr. 19, 2007

(65) Prior Publication Data
US 2008/0115013 A1 May 15, 2008

(30) Foreign Application Priority Data

Nov. 10, 2006 (KR) .......................... 10-2006-0111035

(51) Int. Cl.
*H04K 1/00* (2006.01)
(52) U.S. Cl.
USPC .................. 380/2; 380/203; 713/161; 726/26
(58) Field of Classification Search
USPC ............................................................. 380/2
See application file for complete search history.

(56) References Cited

U.S. PATENT DOCUMENTS

| 6,073,193 | A | 6/2000 | Yap | |
|---|---|---|---|---|
| 2004/0205201 | A1* | 10/2004 | Katsube et al. | 709/229 |
| 2005/0062735 | A1* | 3/2005 | Kim | 345/204 |
| 2005/0225547 | A1* | 10/2005 | Choi | 345/211 |
| 2006/0154670 | A1* | 7/2006 | Miyabayashi et al. | 455/450 |
| 2006/0168651 | A1* | 7/2006 | Araki et al. | 726/6 |
| 2007/0074241 | A1* | 3/2007 | Yeo | 725/31 |
| 2007/0089160 | A1* | 4/2007 | Ando | 725/143 |
| 2007/0130625 | A1* | 6/2007 | Lee | 726/26 |

FOREIGN PATENT DOCUMENTS

| EP | 1761052 A2 | 3/2007 |
|---|---|---|
| KR | 10-2004-0066618 A | 7/2004 |
| KR | 10-2005-0099305 A | 10/2005 |
| WO | 2005/098589 A1 | 10/2005 |

OTHER PUBLICATIONS

Anonymous: "High-Definition Multimedia Interface Specification, specification version 1.3", Jun. 22, 2006, total 237 pages, XP030001519.
Extended European Search Report issued Mar. 14, 2011 in counterpart European Application No. 07115030.4.
Communication dated Mar. 7, 2013 from the Korean Intellectual Property Office in a counterpart application No. 10-2006-0111035.

* cited by examiner

*Primary Examiner* — Krisna Lim
*Assistant Examiner* — Arvin Eskandarnia
(74) *Attorney, Agent, or Firm* — Sughrue Mion, PLLC

(57) ABSTRACT

A method of authentication and an image display apparatus incorporating the method are provided. The method of authentication includes determining whether or not an error is generated in an authentication with an externally-connected multimedia source, and upon determination that the authentication error is generated, changing a reset signal to re-attempt the authentication and output to the multimedia source. As a result, successful High Bandwidth Digital Content Protection (HDCP) authentication can be provided at all times.

15 Claims, 5 Drawing Sheets

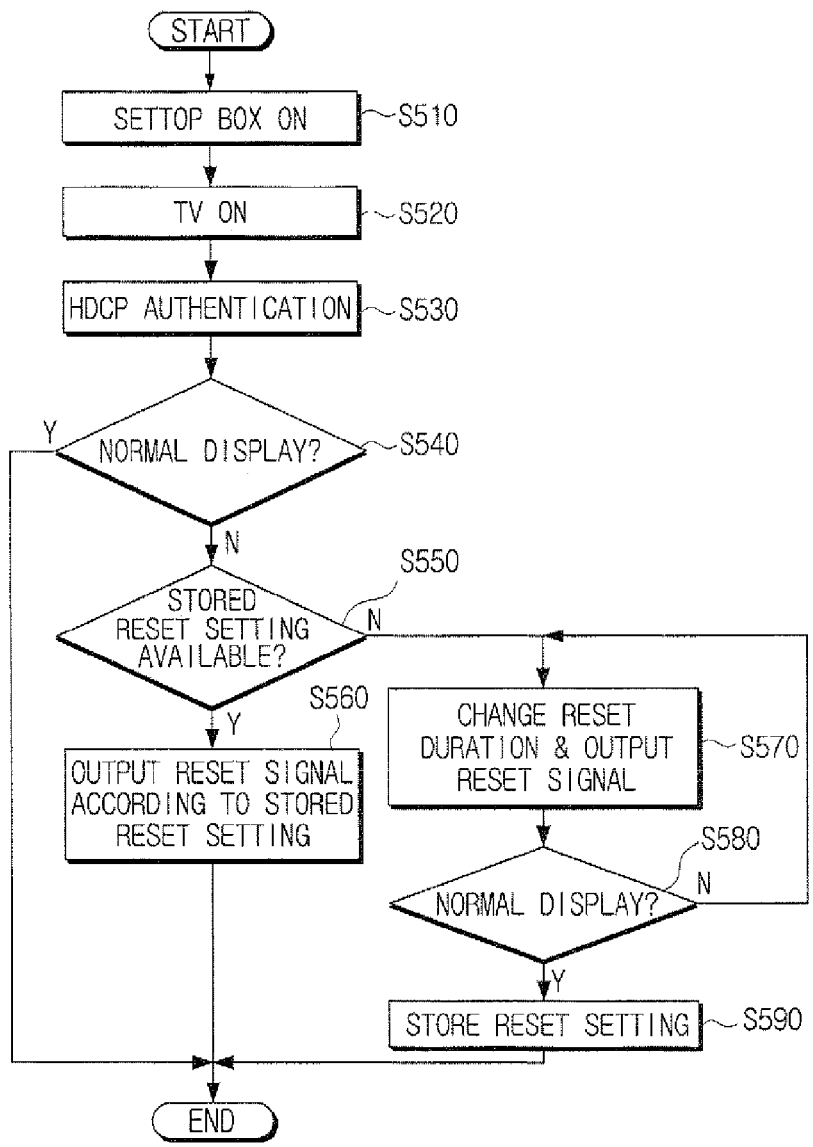

METHOD OF AUTHENTICATION, AND IMAGE DISPLAY APPARATUS INCORPORATING THE METHOD

CROSS-REFERENCE TO RELATED APPLICATION

This application claims priority from Korean Patent Application No. 10-2006-111035, filed Nov. 10, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to authentication and an image display apparatus thereof, and more particularly, to an authenticating method which prevents an abnormal screen from being displayed due to High Bandwidth Digital Content Protection (HDCP) authentication error, and an image display apparatus thereof.

2. Description of the Related Art

Widespread distribution of digital images has brought introduction of interface between digital image devices such as settop boxes, DVD players, multimedia sources such as PCs, and video displays such as AV devices, monitors, digital televisions.

Digital interfaces such as Digital Visual Interface (DVI) and High Definition Multimedia Interface (HDMI) are available, and unlicensed copying of digital content through the digital interfaces is prohibited under the specification, High Bandwidth Digital Content Protection (HDCP).

FIG. 1 illustrates the structure of a multimedia source system being connected with an associated video display through a digital interface. Referring to FIG. 1, a settop box 10 is connected with a TV 100 through DVI/HDMI cable.

The settop box 10 detects that it is connected with the TV 100 through DVI/HDMI cable, based on a HPD signal being input from the TV 100. The settop box 10 determines that the TV 100 has a HDCP authentication key, in response to a high HPD signal. Upon determination that the TV 100 has the HDCP authentication key, the settop box 10 outputs digital video data which represent normal screen on the TV 100. If determining that the TV 100 does not have a HDCP authentication key, the settop box 10 outputs scrambled digital video data, which represent abnormal image on the TV 100.

The settop box 10 generally determines the presence of a HDCP authentication key of the TV 100 in every two or three seconds. However, some settop boxes determine that the TV 100 does not have a HDCP authentication key, if the TV 100 is turned on after the settop boxes.

Accordingly, some settop boxes output scrambled digital video data on the TV 100, mistakenly determining that the TV 100 does not have a HDCP authentication key.

The similar mistake can arise when the HDCP authentication of the TV 100 was successful. That is, in certain cases, erroneous authentication information may be transmitted to the settop box 10 or the authentication information may not be transmitted to the settop box 10 at all, due to communication error between the TV 100 and the settop box 10, or by accidental power reset.

Because the settop box 10 erroneously determines that the TV 100 does not have a HDCP authentication key, scrambled digital video data is output on the TV 100 and as a result, abnormal screen is displayed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Aspects of the present invention provide an authentication method which enables normal re-authentication even with a High Bandwidth Digital Content Protection (HDCP) authentication error, and an image display apparatus incorporating the authentication method.

An exemplary aspect of the present invention provides a method of authentication, comprising: determining whether or not an error is generated in an authentication with an externally-connected multimedia source, and upon determination that the authentication error is generated, changing a reset signal to re-attempt the authentication and output to the multimedia source.

The output to the multimedia source may comprise changing a reset duration included in the reset signal and outputting the reset signal until the multimedia source re-attempts the authentication.

The outputting to the multimedia source may comprise continuously changing the input duration of a high level control signal, to change the reset duration.

The authentication may comprise a High Bandwidth Digital Content Protection (HDCP) authentication, the reset signal comprises a Hot Plug Detection (HPD) signal, and the reset duration comprises a Hot Plug Reset Duration (HPRD).

Storing the settings of the multimedia source according to the changed reset signal may be further provided.

The storing may comprise storing the settings according to the changed reset signal, if digital image data for displaying normal image is received from the multimedia source after output of the changed reset signal to the multimedia source.

In an exemplary implementation, a method of authentication may further comprise determining whether or not a reset settings are stored, if determining that the authentication error is generated, and outputting a reset signal which corresponds to the stored reset settings, if determining that the reset settings are stored.

The reset settings correspond to a reset signal which is optimized to the multimedia source, and comprises includes at least one of a name or serial number of the multimedia source, and an input duration of a high level control signal to generate the optimized reset signal.

Another exemplary aspect of the present invention provides an image display apparatus, comprising: a reset signal generating unit which changes a reset signal and generates a changed reset signal such that an externally-connected multimedia source re-attempts an authentication, and a controller which controls the reset signal generating unit to change and output the changed reset signal, if determining that an error is generated in an authentication with the multimedia source.

The controller may control the reset signal generating unit to change a reset duration included in the reset signal and output the signal, until the multimedia source re-attempts the authentication.

The controller may change an input duration of a high level control signal, to change the reset duration.

The reset signal generating unit may generate a high level reset signal, if a low level control signal is input from the controller, and change a low level reset duration, if the high level control signal is input.

The authentication may comprise a High Bandwidth Digital Content Protection (HDCP) authentication, the reset signal comprises a Hot Plug Detection (HPD) signal, and the reset duration comprises a Hot Plug Reset Duration (HPRD).

A storage unit may be further provided, which stores the settings of the multimedia source according to the changed reset signal.

The controller may cause the settings according to the changed reset signal to be stored in the storage unit, if digital image data for displaying normal image is received from the multimedia source after output of the changed reset signal to the multimedia source.

The controller may control the reset signal generating unit to determine whether or not reset settings are stored, if determining that the authentication error is generated, and to output a reset signal corresponding to the stored reset settings, if determining that the reset settings are stored.

The reset settings may correspond to a reset signal which is optimized to the multimedia source, and comprise at least one of a name or serial number of the multimedia source, and an input duration of a high level control signal to generate the optimized reset signal.

In an exemplary implementation, an image display apparatus may further comprise a connecting unit which is connected with the multimedia source through a Digital Visual Interface (DVI) and a High Definition Multimedia Interface (HDMI), and a display unit which displays thereon one of the digital image data and scrambled digital image data, being received through the connecting unit.

The multimedia source may comprise at least one of a settop box, a digital versatile disk (DVD) player and a personal computer (PC).

BRIEF DESCRIPTION OF THE DRAWINGS

The above aspects and other features of the present invention will become more apparent by describing in detail exemplary embodiments thereof with reference to the attached drawings, in which:

FIG. 5 is a flowchart illustrating a method of authentication of an image display apparatus according to another exemplary embodiment of the present invention.

DETAILED DESCRIPTION OF THE
EXEMPLARY EMBODIMENTS OF THE
INVENTION

Hereinafter, aspects of the present invention will be described in detail with reference to the drawings.

Figure 1:
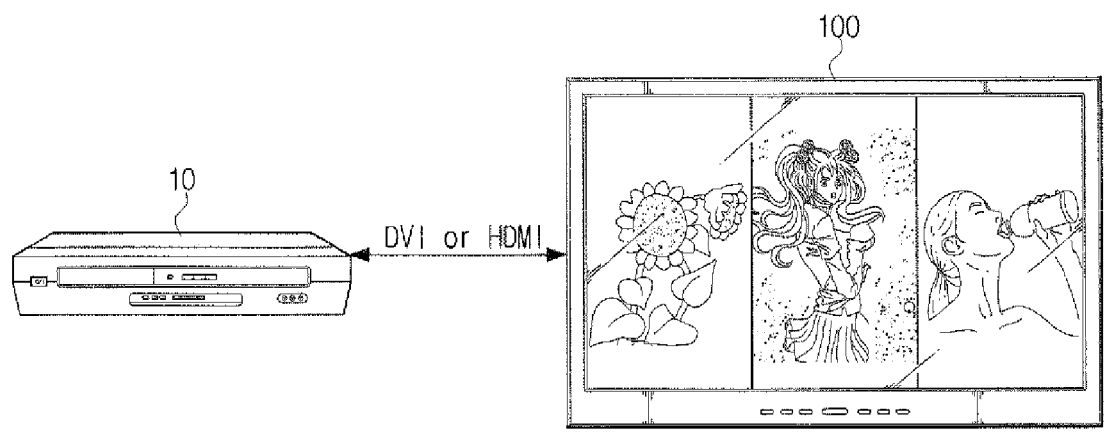
FIG. 1 illustrates the structure of a multimedia source system being connected with a related art image display apparatus through a digital interface.
Figure 2:
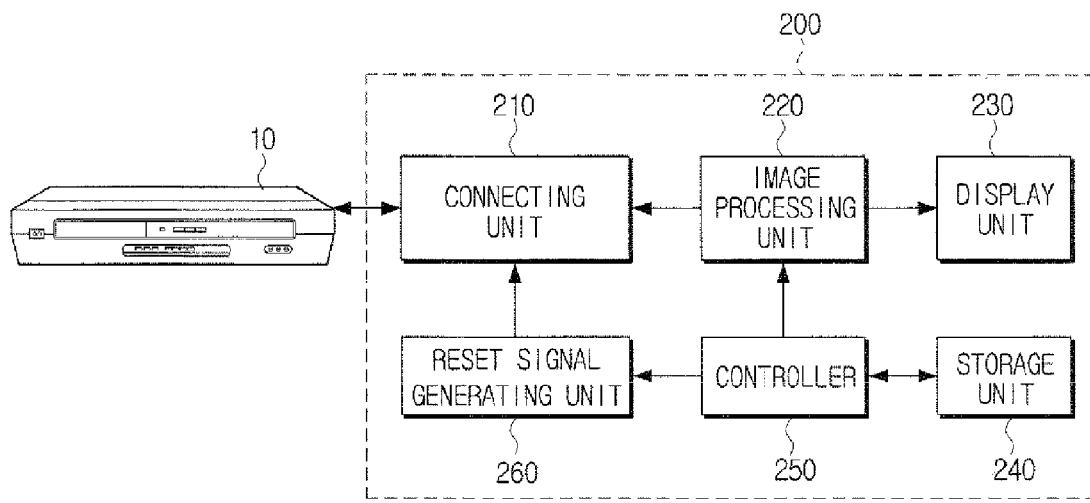
FIG. 2 is a block diagram of an image display apparatus according to an exemplary embodiment of the present invention.

FIG. 2 is a block diagram of an image display apparatus according to an exemplary embodiment of the present invention.

In an exemplary implementation, a TV 200 is connected with a settop box 10 through a DVI/HDMI cable, and upon successful authentication, the TV 200 displays thereon a digital image being transmitted from the settop box 10 through the cable. The TV 200 outputs a reset signal optimized to the associated settop box 10 such that successful re-authentication is possible even when a HDCP authentication error is generated. As a result, a normal digital image can be displayed.

Referring to FIG. 2, the TV 200 may include a connecting unit 210, an image processing unit 220, a display unit 230, a storage unit 240, a controller 250, and a reset signal generating unit 260.

The connecting unit 210 is connected with the settop box 10, and receives digital image data therefrom. The connecting unit 210 receives a HDMI recognition signal according to a voltage being output from the settop box 10, and a HDCP authentication request signal, and outputs a high level of Hot Plug Detection (HPD) signal and a HDCP authentication response signal to the settop box 10 as a response signal.

The image processing unit 220 processes the digital image data being received through the connecting unit 210 into a displayable form, using the HDCP authentication key, and displays the digital image corresponding to the processed digital image data on the display unit 230.

The storage unit 240 stores settings of a HPD signal which is optimized to the settop box 10, according to the control of the controller 250. In one exemplary implementation, the storage unit 240 may be an Electrically Erasable Programmable Read-Only Memory (EEPROM).

The controller 250, upon receipt of a HDCP authentication request signal from the connecting unit 210, controls the reset signal generating unit 260 to output a HPD signal. The controller 250, upon receipt of a HDCP authentication request signal from the connecting unit 210, outputs a HDCP authentication response signal to the settop box 10 through the connecting unit 210, to indicate the presence of the HDCP authentication key.

If a HDCP authentication response signal, indicating a successful HDCP authentication, is not received from the settop box 10, or scrambled digital image data is received, the controller 250 determines that a HDCP authentication error is generated.

The controller 250 controls the reset signal generating unit 260 to change a reset duration such that a HPD signal, which is optimized to the settop box 10, is generated and output. The controller 250 also causes the settings associated with the optimized HPD signal to be stored in the storage unit 260.

According to the control of the controller 250, the reset signal generating unit 260 changes the reset duration such that a HPD signal is generated and output to the settop box 10 through the connecting unit 210.

The settop box 10 determines that the TV 200 has been disconnected and then connected, or the TV 200 is being turned on, if the HPD signal being input through the connecting unit 210 is changed from low level to high level, and thus performs HDCP authentication again.

Figure 3:
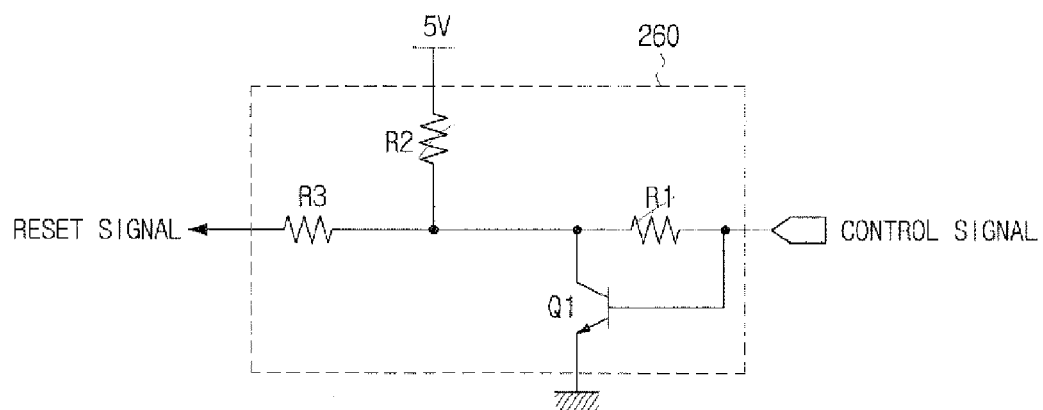
FIG. 3 illustrates a reset signal generating unit according to an exemplary embodiment of the present invention.

FIG. 3 illustrates the reset signal generating unit 260 according to an exemplary embodiment of the present invention.

Referring to FIG. 3, the reset generating unit 260 may include resistors R1, R2, R3, and transistor Q1, and receive 5V voltage. A control signal is output by the controller 250 to change the reset duration of the reset signal. The control signal may be either a low level signal or a high level signal.

Because different reset durations are required for the multimedia sources, that is, because different Hot Plug Reset Durations (HPRD) are required for each of the multimedia sources, a HDCP authentication may not be performed with an initial HPD signal of the TV 200. That is, because the settop box 10 determines that the TV 200 is not connected, if the low level HPRD contained in the HPD signal being received from the TV 200 does not match the HPRD required by the settop box 10, the HDCP authentication may not be performed. Accordingly, the controller 250 of the TV 200 outputs a control signal to the reset signal generating unit 260 such that an optimized reset signal, that is, a HPD signal, which is optimized to the requirement by the settop box 10, is generated and output to perform HDCP re-authentication.

More specifically, upon receipt of a low level control signal from the controller 250, the transistor Q1 of the reset signal generating unit 260 is switched off, and 5V voltage is output as a high level reset signal, that is, output as a HPD signal by the resistors R2 and R3. Upon receipt of a high level control signal from the controller 250, the transistor Q1 is switched on, and 5V voltage is grounded and output as a low level HPD signal.

According to the duration that the controller 250 inputs a high level control signal, that is, according to a high level input duration, a HPRD being output by the reset signal generating unit 260 is changed. Accordingly, in order for the settop box 10 to re-perform HDCP authentication, the controller 250 sequentially increments the high level input duration until a HPD signal, which is optimized to the settop box 10, is generated.

Figure 4:
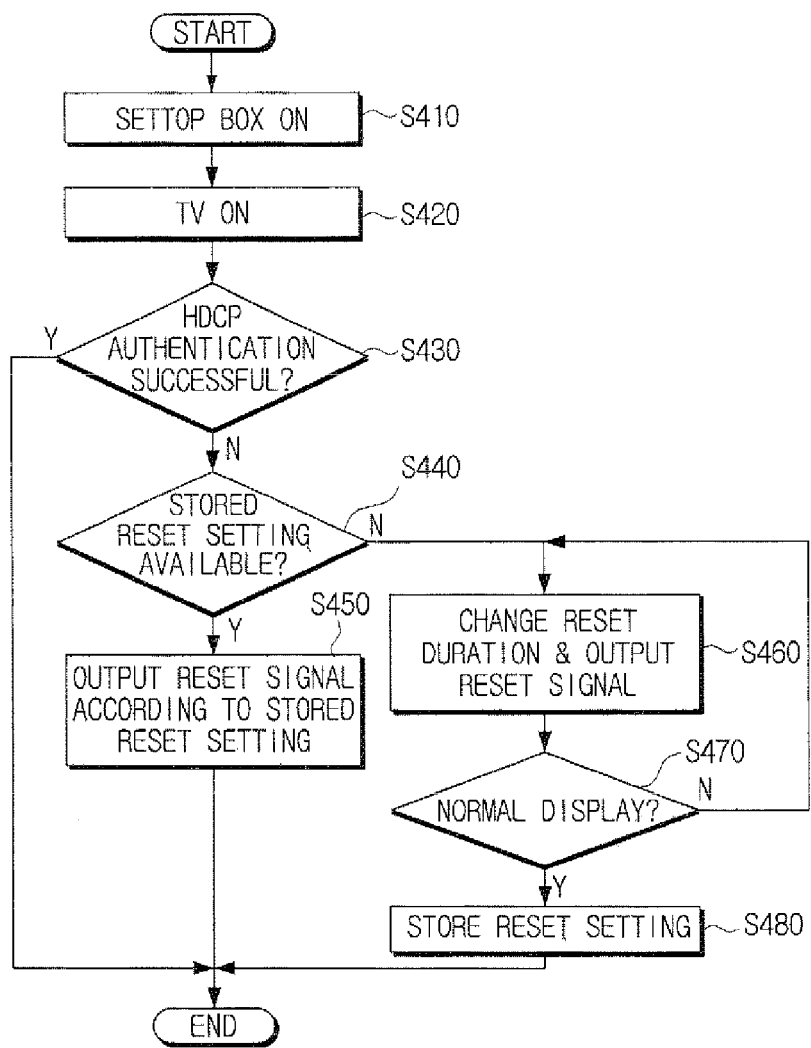
FIG. 4 is a flowchart illustrating a method of authentication of an image display apparatus according to an exemplary embodiment of the present invention.

FIG. 4 is a flowchart provided to explain a method of authentication of an image display apparatus according to an exemplary embodiment of the present invention.

Referring to FIG. 4, in one implementation, the settop box 10 determines the presence or absence of a HDCP authentication key in the TV 200 only once, that is, upon turning on. Accordingly, in this implementation, the settop box 10 does not determine the presence or absence of a HDCP authentication key, once the settop box 10 determined that there is no HDCP authentication key in the TV 200.

After the settop box 10 is turned on (S410), the TV 200 is turned on (S420). Because the TV 200 is turned on after the settop box 10, the settop box 10 determines that the TV 200 does not have a HDCP authentication key.

The controller 250 of the TV 200 determines whether or not the HDCP authentication is successful (S430). That is, the controller 250 determines that the HDCP authentication is unsuccessful, that is, determines that the HDCP authentication includes an error, if a HDCP authentication request signal is not received from the settop box 10.

Upon determination that the HDCP authentication is unsuccessful (S430-N), the controller 250 determines whether the reset settings corresponding to the settop box 10 are stored in the storage unit 240 (S440). The reset settings may include conditions for an optimal HPD signal for the settop box 10, including, for example, the name or serial number of the settop box 10, or a high level input duration at which a control signal to generate a low level HPRD as required by the settop box 10 is constantly input.

Upon determination that the reset settings of the settop box 10 are stored (S440-Y), the controller 250 controls the reset signal generating unit 260 to generate a HPD signal according to the reset settings associated with the settop box 10 stored in the storage unit 240 and output the generated HPD signal (S450).

Upon determination that the associated reset settings of the settop box 10 are not stored (S440-N), the controller 250 controls the reset signal generating unit 260 to change the HPRD such that a HPD signal is generated and output (S460).

For example, the controller 250 may output to the reset signal generating unit 260 a high level control signal, in which the high level input duration is extended by 200 ms. A certain high level input duration may be used, or alternatively, a corresponding menu may be provided such that the high level input duration is set by the user.

The controller 250 determines whether or not digital image data for displaying normal image, is received from the settop box 10 (S470). That is, the controller 250, upon receipt of the digital image data which is not scrambled, determines that the HPD signal is the HPD signal optimized to the settop box 10.

Additionally, upon receive of the digital image data which is not scrambled, the controller 250 determines that the settop box 10 performs the HDCP authentication again and that the HDCP authentication is successful.

Upon determination that the digital image data for displaying normal image is received (S470-Y), the controller 250 stores to the storage unit 240, the reset settings of the HPD signal optimized to the settop box 10 (S480).

Upon determination that the digital image data for displaying normal image is not received (S470-N), the controller 250 increments the high level input duration by 200 ms at a time and outputs to the reset signal generating unit 260, until the digital image data for displaying normal image is received. Although the high level input duration is extended by 200 ms at a time, it is for the exemplary purpose. In another example, a certain fixed duration may be used, or a certain duration which is variable depending on situations, may also be used.

FIG. 5 is a flowchart illustrating a method of authentication of an image display apparatus according to an exemplary embodiment of the present invention.

Referring to FIG. 5, the example illustrates when the HDCP authentication of the TV 200 was successful, but a HDCP authentication error was generated later.

After the settop box 10 is turned on (S510), and TV 200 is turned on (S520). The settop box 10 and the controller 250 of the TV 200 performs HDCP authentication (S530). That is, the controller 250, in response to a HDCP authentication request signal received through the connecting unit 210, outputs a HDCP authentication response signal, indicating the presence of HDCP authentication key, to the settop box 10 through the connecting unit 210.

The controller 250 determines whether or not digital image data for displaying normal image is being received from the settop box 10 (S540). Upon determination that the digital image data for displaying normal image is not received, the controller 250 determines that a HDCP recognition error is generated due to communication error in which the HDCP authentication response signal is not received at the settop box 10. Alternatively, the controller 250 may determine that the HDCP recognition error is generated as the TV 200 is turned off and then turned on.

Upon determination that the digital image data for displaying normal image is not received (S540-N), the controller 250 determines that a HDCP recognition error is generated, and determines whether the reset settings associated with the settop box 10 are stored in the storage unit 240 (S550).

Upon determination that the reset settings associated with the settop box 10 are stored in the storage unit 240 (S550-Y), the controller 250 controls the reset signal generating unit 260 to generate and output a HPD signal according to the reset settings associated with the settop box 10 and stored in the storage unit 240 (S560).

Upon determination that the reset settings associated with the settop box 10 are not stored (S550-N), the controller 250 controls the reset signal generating unit 260 to change the HPRD, and generate and output a HPD signal (S570).

The controller 250 determines whether or not digital image data for displaying normal image is received from the settop box 10 (S580).

Upon determination that the digital image data for displaying normal image is received (S580-Y), the controller 250 causes the reset settings associated with a HPD signal which is optimized to the settop box 10, to be stored in the storage unit 240 (S590).

Upon determination that the digital image data for displaying normal image is not received (S580-N), the controller 250 increments the high level input duration sequentially and outputs to the reset signal generating unit 260, until the digital image data for displaying normal image is received.

Figure 6A:
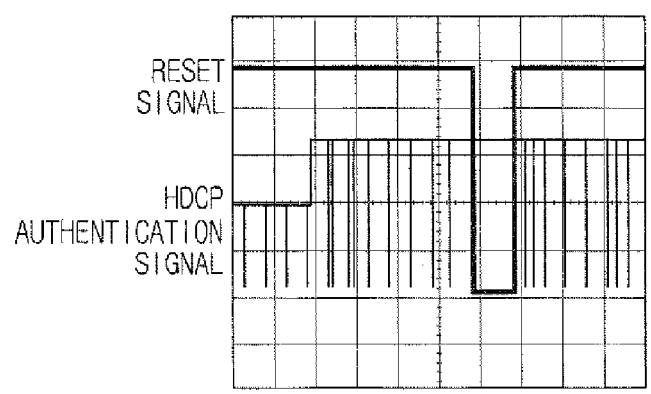
FIGS. 6A and 6B are waveforms provided for explaining a method of an image display apparatus according to an exemplary embodiment of the present invention.
Figure 6B:
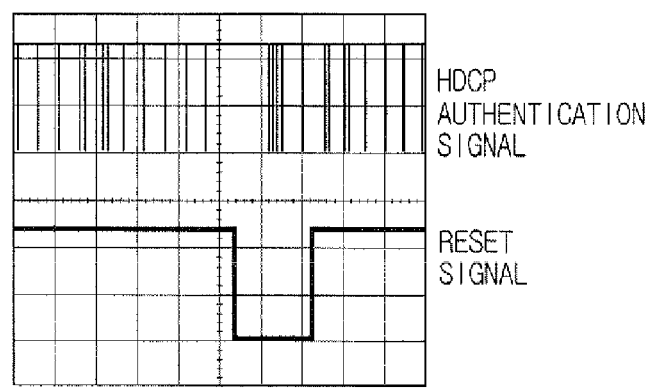

FIGS. 6A and 6B are waveforms provided to explain a method of authentication of an image display apparatus according to an exemplary embodiment of the present invention.

FIG. 6A is the waveform of a HDCP authentication signal, which indicates unsuccessful HDCP authentication in a reset duration included in the reset signal, that is, when the low level HPRD is 1 sec. FIG. 6B is the waveform of a HDCP authentication signal, which indicates successful HDCP authentication, when the low level HPRD included in the reset signal is changed to 1.6 sec.

The controller 250 causes the high level input duration to increment sequentially, until a HDCP authentication signal indicative of successful HDCP authentication is received from the settop box 10, such that the low level HPRD is varied and optimized to the settop box 10.

Accordingly, in an implementation that only one HDCP authentication is performed upon turning on of the associated multimedia source, a reset signal optimized to the associated multimedia source or a new multimedia source, can be provided, even when a HDCP authentication error is generated. As a result, re-attempt of HDCP authentication can be performed successfully. The reset signals optimized to the respective multimedia sources may also be stored, in which case the successful HDCP authentication can be provided at all time.

Although the HDCP authentication was explained as an example above, one will understand that the inventive concept of the present invention can be applied to other types of authentication.

As explained above, according to the exemplary embodiments of the present invention, successful HDCP authentication can be provided at all times.

The above description is illustrative and not restrictive. Many variations of the invention will become apparent to those of skill in the art upon review of this disclosure. The scope of the invention should, therefore, not be determined by the above descriptions, but instead should be determined by the appended claims along with their full scope of equivalents.

What is claimed is:

1. A method of authentication, comprising:
   determining whether an error is generated in an authentication with an externally-connected multimedia source;
   upon determining that the authentication error is generated, determining whether reset settings are stored;
   upon determining that reset settings are stored in an image display apparatus, outputting a reset signal according to the stored reset settings;
   upon determining that the reset settings are not stored, changing a reset duration and outputting the reset signal to re-attempt the authentication and outputting to the multimedia source; and
   upon determining that digital image data for displaying a normal image is received, storing the reset settings,
   wherein the reset settings comprise conditions for the outputting of the reset signal, and
   wherein the conditions comprise a duration in which the reset signal is provided.

2. The method of claim 1, wherein the output to the multimedia source comprises changing a reset duration comprised in the reset signal and outputting the reset signal until the multimedia source re-attempts the authentication.

3. The method of claim 2, wherein the output to the multimedia source comprises continuously changing the input duration of a high level control signal, to change the reset duration.

4. The method of claim 2, wherein the authentication comprises a High Bandwidth Digital Content Protection (HDCP) authentication, the reset signal comprises a Hot Plug Detection (HPD) signal, and the reset duration comprises a Hot Plug Reset Duration (HPRD).

5. The method of claim 1, further comprising storing settings of the multimedia source according to the changed reset signal.

6. The method of claim 5, wherein the storing comprises storing the settings according to the changed reset signal, if digital image data for displaying a normal image is received from the multimedia source after output of the changed reset signal to the multimedia source.

7. The method of claim 1, wherein the reset settings correspond to a reset signal which is optimized to the multimedia source, and comprises at least one of a name or serial number of the multimedia source, and an input duration of a high level control signal to generate the optimized reset signal.

8. An image display apparatus, comprising:
   a reset signal generating unit which changes a reset signal and generates a changed reset signal such that an externally-connected multimedia source re-attempts an authentication;
   a storage unit configured to store reset settings; and
   a controller configured
   to determine whether an error is generated in an authentication with the multimedia source,
   to control the reset signal generating unit to determine whether the reset settings are stored in the storage unit upon determination that the authentication error is generated,
   to control the reset signal generating unit to output the reset signal upon determining that the reset settings are stored in the storage unit,
   to control the reset signal generating unit to change and output the changed reset signal upon determination that the reset settings are not stored and
   to store the reset settings in the storage unit upon determining that digital image data for displaying a normal image is received,
   wherein the reset settings comprise conditions for the output of the reset signal, and
   wherein the conditions comprise a duration in which the reset signal is provided.

9. The image display apparatus of claim 8, wherein the controller controls the reset signal generating unit to change a reset duration comprised in the reset signal and output the signal, until the multimedia source re-attempts the authentication.

10. The image display apparatus of claim 9, wherein the controller changes an input duration of a high level control signal, to change the reset duration.

11. The image display apparatus of claim 9, wherein the reset signal generating unit generates a high level reset signal, if a low level control signal is input from the controller, and changes a low level reset duration, if the high level control signal is input.

12. The image display apparatus of claim 9, wherein the authentication comprises a High Bandwidth Digital Content Protection (HDCP) authentication, the reset signal comprises a Hot Plug Detection (HPD) signal, and the reset duration comprises a Hot Plug Reset Duration (HPRD).

13. The image display apparatus of claim 8, wherein the reset settings correspond to a reset signal which is optimized to the multimedia source, and comprises at least one of a name or serial number of the multimedia source, and an input duration of a high level control signal to generate the optimized reset signal.

14. The image display apparatus of claim 8, further comprising:
 a connecting unit which is connected with the multimedia source through a Digital Visual Interface (DVI) and a High Definition Multimedia Interface (HDMI); and
 a display unit which displays thereon one of the digital image data and scrambled digital image data, being received through the connecting unit.

15. The image display apparatus of claim 8, wherein the multimedia source comprises at least one of a settop box, a digital versatile disk (DVD) player and a personal computer (PC).

\* \* \* \* \*